No. 6,579. PATENTED JULY 3, 1849.
J. BAILEY.
WASTE PICKER.
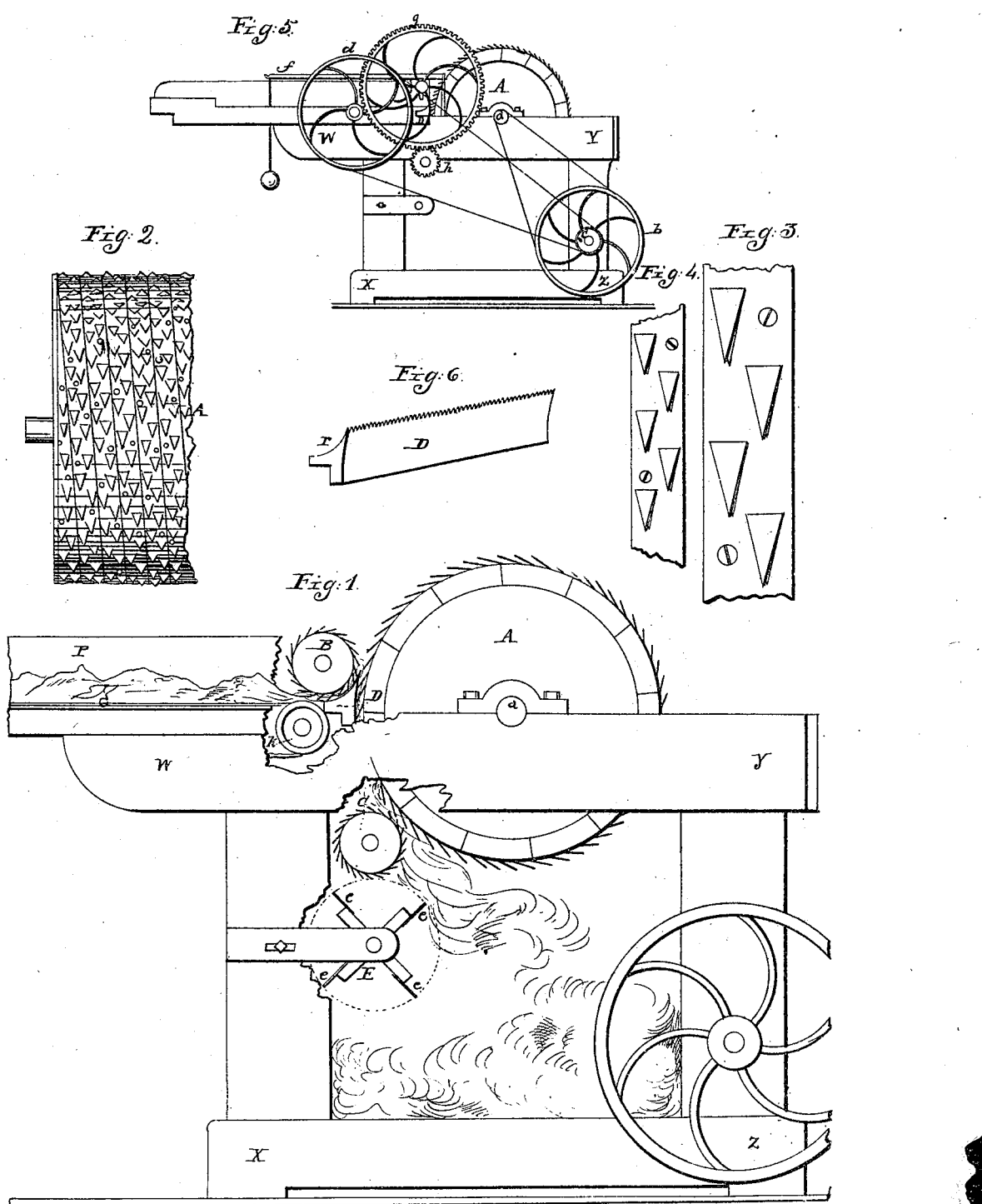

UNITED STATES PATENT OFFICE.

JOSHUA BAILEY, OF COHOES, NEW YORK.

MACHINERY FOR PICKING WASTE.

Specification of Letters Patent No. 6,579, dated July 3, 1849.

*To all whom it may concern:*

Be it known that I, JOSHUA BAILEY, of Cohoes, in the county of Albany, State of New York, have invented a new and improved machine for separating the fiber of woolen, cotton, hempen, or linen fabrics, rags, yarn, or any kind of waste or raw material for the purpose of refabricating the same into yarn and cloth, which I call "Bailey's waste-picker"; and I do declare the following to be a full and perfect description of the same, as set forth in the following specification and the drawings hereto attached as part thereof, viz:

I build a strong rectangular frame of which W X Y Z, Figures 1 and 5 represent one side, the other side precisely similar in structure being framed and secured parallel with it, and about thirty two inches apart from it. Upon this frame, secured to it by proper standards, boxes, caps, and the fixtures commonly used for such purposes is placed the following machinery: A a hollow wheel or drum about 18 inches in diameter and 31 long made of wood or iron in any way so as to make it fit and convenient to receive and make secure the teeth or pickers which are to be fitted on its periphery. It revolves upon its axis $a$. These pickers are constructed by taking long bars of hoop iron of an inch and quarter wide, and with a suitable punch or cutter making at short and convenient intervals incisions like the letter V as shown at Fig. 3, through their whole length—the tongues produced by this cutting are then bent up from their base or uncut part at an angle of about thirty degrees from the plane of the bar. The bars thus prepared are now laid on the cylinder or drum A and wound spirally round the same from one end or head to the other, and secured thereto by screws or otherwise in the manner shown in Fig. 2.

Directly in front of this cylinder and nearly on a level with its axis a metallic comb D Figs. 1, 5, 6 extends across its whole front. This consists of a bar of iron or other metal having a face a few inches wide concentric with the main cylinder A and placed as near to it, as may be without touching the pickers. The upper edge of this bar is serrated or cut into small notches like saw teeth. Its most convenient form is seen in its perspective view Fig. 6. The upper side of this comb $r$ is curved concentric with a lesser cylinder or roller B which is placed obliquely above it so that its outer edge of pickers shall just clear the said upper side of the comb. This roller B is as long as the cylinder A and about 4 inches in diameter, and is clothed or covered with pickers in a manner similar to the cylinder A only the dimensions of the bars of iron, and the size of the teeth are nearly one half less. The axis of this roller are kept down in their sockets by weighted levers, the one of which is marked $f$ in Fig. 5.

Figs. 3 and 4 show the full size and shape of the bars and teeth used at present on both sets of rollers. A second small roller C also covered with pickers exactly similar to B is placed some 10 or 12 inches below the first one, and as near to the cylinder A as may be without the interference of the pickers. Below this is placed a whipper E (as it is called) which is a fan wheel some 6 inches in diameter, extending along the whole front of the last roller having attached to its upper edge of each of its fans a slip of leather $e, e, e, e$, which in its revolutions just touch the points of the pickers on the roller C.

By means of suitable rollers, one of which is shown at, $k$, Fig. 1, a feeding apron is arranged in a line with the lower edge of the upper feeding roller B to convey the rags and waste &c. to be picked from feed box P.

The pickers or teeth of cylinder A as seen from the front of the machine (the feed box) point downward, those of the upper roller point upward and of the lower roller downward.

The first motion is communicated to a pulley on the axis of cylinder A on the further side from the spectator, which is made to revolve 1,600 to 2,000 times a minute. By a pulley $a$ on this end of the axis $1\frac{1}{2}$ inches diameter and strap its motion is communicated to pulley $b$ 16 inches diameter and by pulley $c$ on its axis of $2\frac{3}{4}$ inches to pulley $d$ 14 inches diameter. From its axis by wheel of 3 inches motion is given to cog wheel $g$ of 17 inches—which wheel is fixed on the axis of upper roller B. The wheel $g$ also by wheel $h$ of 4 inches gives motion to lower roller C. The whipper E is driven by a pulley of $1\frac{1}{2}$ inches on the axis of the main cylinder, banded on an 8 inch pulley upon its own shaft, this gearing is on the side of the machine from the spectator.

The operation of the machine is as follows: Being put in motion and material supplied upon the feeding apron G it is taken up by the feeding roller B, which turns round at the rate of 5 times in a minute and carried over the teeth of the comb D. It is there seized by the teeth or pickers of the main cylinder A which revolves 1,600 to 2,000 times a minute which strip the material into minute threads or the long fibers of which it is constituted, without tearing or breaking it up into fragments. Any portion that may escape this process, such as the last ends of rags &c which cannot be held by the teeth of the upper roller B, in falling are picked up by the lower roller C and resubjected to the action of the pickers of the main cylinder. The whipper E in the meanwhile running around with great velocity, by its leather edges whips from the teeth of C all the picked material and drives it down on the floor of the machine, in the state of fleece ready for spinning, or any purpose, as for example, paper making.

I do not claim as my invention the use of rollers or cylinders with points or cutters affixed thereon, for the purpose of reducing woolen, cotton or other material into fragments but—

I do claim—

1. The shape and form of the pickers used in my machine as above described, as being peculiarly calculated to separate the threads of the material subjected to them, without injuring them and breaking their fibers to such an extent that they become unfit for carding and spinning.

2. The combination and arrangement of the whole machine with the relative action of the cylinder and roller and whipper to and upon each other, by which the material pressing through the first feed roller is by its relative rate of motion, compared with that of the large cylinder and also the relative arrangement of the teeth of the rollers steadily and properly fed to the action of the pickers of the large cylinders, and at the same time held firmly to insure the due action of the pickers, and by which also, the second roller is made to seize the unfinished fragments that may be dropt from the first roller, and subjects them to the action of the pickers, in a similar manner to the operation of the first roller, so that the whole substance of the supplied material is thoroughly picked into long fibers and prepared for carding and spining into thread.

I claim as my improvement in waste picking machines, the application of picker cylinders constructed, and arranged to operate together, substantially as herein set forth and described, having teeth made in the manner and form set forth.

JOSHUA BAILEY.

Witnesses:
RICHARD VARICK DE WITT,
W. C. MILLER.